Swett & Drake.
Apple Corer.
Nº 95,286. Patented Sep. 28, 1869.
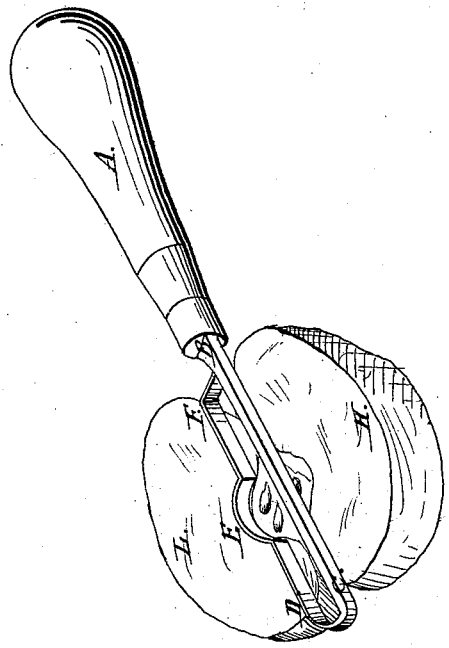
Witnesses:
Frank G. Parker
Jno. L. Grant
Inventor:
G. L. Swett
B. F. Drake

United States Patent Office.

G. L. SWETT AND B. F. DRAKE, OF LEOMINSTER, MASSACHUSETTS.

Letters Patent No. 95,286, dated September 28, 1869.

IMPROVED APPLE-CORER.

The Schedule referred to in these Letters Patent and making part of the same.

*To all whom it may concern:*

Be it known that we, G. L. SWETT and B. F. DRAKE, both of Leominster, in the county of Worcester, and State of Massachusetts, have invented certain new and useful Improvements in Apple-Corers; and we do hereby declare that the following is a full and exact description thereof, reference being had to the accompanying drawings, and to the letters of reference marked thereon.

The nature of our invention consists in forming a knife of peculiar shape, and in attaching it to a rod, about the axis of which it may revolve, the axial rod acting as a guard to confine its action to the core-part of the apple, the apple having been previously halved.

To enable others skilled in the art to make and use our invention, we will proceed to describe its construction and use.

In the drawing, the invention is shown in perspective.

A represents the handle, B C, the axial rod, to which the knife D E F is attached.

The rod B C is rounded, and is made sufficiently long for the largest apples.

The knife D E F is formed as shown, having one sharp edge. The curved part E is intended to cut out the seed-lobe, while the parts D and F cut out the stem and blossom respectively.

The dotted lines L H are intended to indicate a half apple.

To use our invention, the half apple is grasped in one hand and the corer in the other; then place the corer on the apple in such a position that the rod C D will be directly over the centre. Now if the rod be firmly pressed on to the apple, and at the same time revolved, the knife D E F will cut entirely around all parts of the core and thus remove it.

What we claim as our invention, and desire to secure by Letters Patent, is—

The apple-corer B C D E F, made substantially as described, and for the purpose set forth.

G. L. SWETT.
B. F. DRAKE.

Witnesses:
FRANK G. PARKER,
JAS. L. CONANT.